(12) United States Patent
Akutsu

(10) Patent No.: US 9,234,788 B2
(45) Date of Patent: Jan. 12, 2016

(54) METHOD OF AND APPARATUS FOR MEASURING STRENGTH OF ULTRASONIC WAVES

(71) Applicant: NHK SPRING CO., LTD, Yokohama-shi, Kanagawa (JP)

(72) Inventor: Shuichi Akutsu, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 115 days.

(21) Appl. No.: 14/087,602

(22) Filed: Nov. 22, 2013

(65) Prior Publication Data

US 2014/0076054 A1 Mar. 20, 2014

Related U.S. Application Data

(62) Division of application No. 12/957,968, filed on Dec. 1, 2010, now Pat. No. 8,662,093.

(30) Foreign Application Priority Data

Dec. 15, 2009 (JP) ................................. 2009-283887

(51) Int. Cl.
*G01H 3/10* (2006.01)
*B08B 3/12* (2006.01)
*G01H 17/00* (2006.01)

(52) U.S. Cl.
CPC .. *G01H 3/10* (2013.01); *B08B 3/12* (2013.01); *G01H 17/00* (2013.01)

(58) Field of Classification Search
CPC ............ G01H 3/10; G01H 17/00; B08B 3/12; B08B 7/028

USPC ................. 73/649, 645, 646, 1.82; 134/1, 1.3
See application file for complete search history.

(56) References Cited

U.S. PATENT DOCUMENTS 4,893,320 A * 1/1990 Yanagi et al. .................... 377/11
5,647,386 A * 7/1997 Kaiser ............................ 134/113

FOREIGN PATENT DOCUMENTS

| JP | 6-137931 | | 5/1994 |
| JP | 2001-276760 | | 10/2001 |
| JP | 2004-049975 | | 2/2004 |
| JP | 2004049975 A | * | 2/2004 |
| JP | 2004-321875 | | 11/2004 |
| JP | 2007-326088 | | 12/2007 |

OTHER PUBLICATIONS

Machine translation of JP2004-049975A to Okuno dated Feb. 2004.*

* cited by examiner

*Primary Examiner* — Douglas Lee
(74) *Attorney, Agent, or Firm* — Jordan and Hamburg LLP

(57) ABSTRACT

A method of and an apparatus for measuring the strength of ultrasonic waves are provided. They are capable of measuring the strength of ultrasonic waves easily and at low cost without using a sound pressure meter. The ultrasonic wave strength measuring apparatus has a particle source soaked in a cleaning liquid, an oscillator to generate the ultrasonic waves whose strength is going to be measured to vibrate the particle source so that particles are eluted from the particle source into the cleaning liquid, a counter to count the number of particles in the cleaning liquid, and an operation unit to find the strength of the applied ultrasonic waves based on the counted number of particles.

6 Claims, 5 Drawing Sheets

Fig.3A
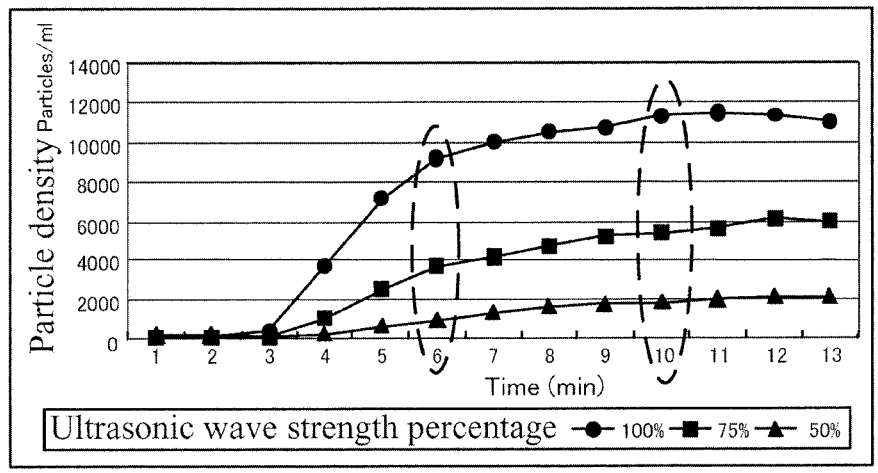
Fig.3B
| | 75:100 | 50:75 | 50:100 |
|---|---|---|---|
| Ultrasonic wave strength percentage (%) | 75 | 67 | 50 |
| Particle number percentage (%) | 44 | 37 | 16 |
Fig.3C
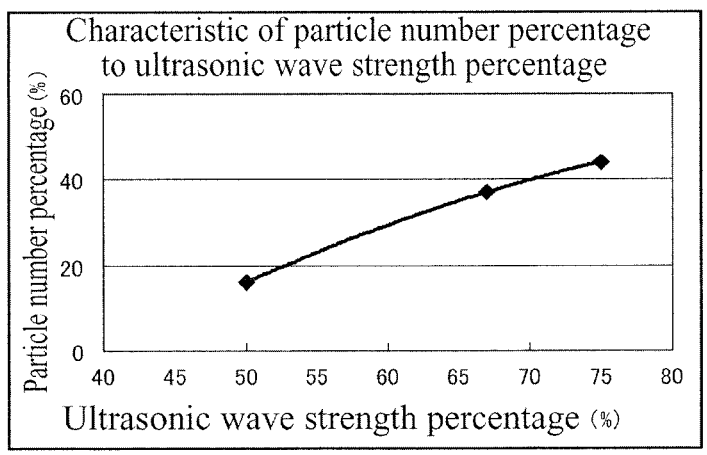

METHOD OF AND APPARATUS FOR MEASURING STRENGTH OF ULTRASONIC WAVES

REFERENCE TO RELATED APPLICATION

This is a divisional application of Ser. No. 12/957,968, filed Dec. 1, 2010, currently allowed. The subject matter of the aforementioned prior application is hereby incorporated herein by reference.

BACKGROUND OF THE INVENTION

1. Field of the Invention

The present invention relates to a method of and an apparatus for measuring the strength of ultrasonic waves used with an ultrasonic cleaner that applies ultrasonic waves to an object soaked in a cleaning liquid in a cleaning tank, to wash the object.

2. Description of Related Art

The information technology (IT) industry is renovated every day. Precision parts incorporated in various devices related to the IT industry must have high cleanliness.

To highly clean the precision parts, ultrasonic cleaning is widely used. In the ultrasonic cleaning, it applies ultrasonic waves to an object immersed in a cleaning liquid in a cleaning tank, to produce cavitation that removes dust particles from the surface of the object. The cavitation is a phenomenon created when ultrasonic waves are applied to an object soaked in a liquid and produces very small bubbles around the object, the bubbles being compressed to collapse and generate shock waves that remove dust particles from the surface of the object.

When washing precision parts with ultrasonic waves, it is required to strictly manage the cleanliness of the precision parts.

For this, a related art such as Japanese Unexamined Patent Application Publication No, H06-137931 puts a sound pressure meter in a cleaning liquid, measures an ultrasonic wave strength with the sound pressure meter, and based on the measured ultrasonic wave strength, manages the cleanliness of an object to wash.

This related art directly measures the strength of ultrasonic waves with the sound pressure meter immersed in a cleaning liquid, and therefore, the sound pressure meter is affected by shock waves created by cavitation caused by the ultrasonic waves. The shock waves may remove dust particles from the surface of the object but they may damage the sound pressure meter itself.

The related art, therefore, needs frequent maintenance including replacement of the sound pressure meter, to increase costs.

SUMMARY OF THE INVENTION

The present invention provides a method of and apparatus for measuring the strength of ultrasonic waves, capable of measuring the ultrasonic wave strength easily and at low cost.

According to an aspect of the present invention, there is provided a method of measuring the strength of ultrasonic waves for use with an ultrasonic cleaner that applies ultrasonic waves to an object soaked in a cleaning liquid in a cleaning tank and thereby cleans the object. The method includes steps of vibrating a particle source soaked in the cleaning liquid with the ultrasonic waves whose strength is going to be measured, so that particles are eluted from the particle source into the cleaning liquid, counting the number of particles in the cleaning liquid, and finding the strength of the ultrasonic waves based on the counted number of particles.

This aspect of the present invention is capable of measuring the strength of ultrasonic waves easily and at low cost without using a sound pressure meter.

BRIEF DESCRIPTION OF THE DRAWINGS

FIGS. 3A to 3C explain correlation tables that correlate the numbers of particles with ultrasonic wave strengths;

DETAILED DESCRIPTION OF EMBODIMENTS

An embodiment of the present invention will be explained in detail with reference to the drawings. The embodiment measures the strength of ultrasonic waves easily and at low cost through the steps of vibrating a particle source soaked in a cleaning liquid with the ultrasonic waves whose strength is going to be measured, so that particles are eluted from the particle source into the cleaning liquid, counting the number of particles in the cleaning liquid, and finding the strength of the ultrasonic waves based on the counted number of particles.

First, an apparatus for measuring the strength of ultrasonic waves according to the first embodiment of the present invention will be explained with reference to FIG. 1 which is a block diagram illustrating the apparatus.

Figure 1:
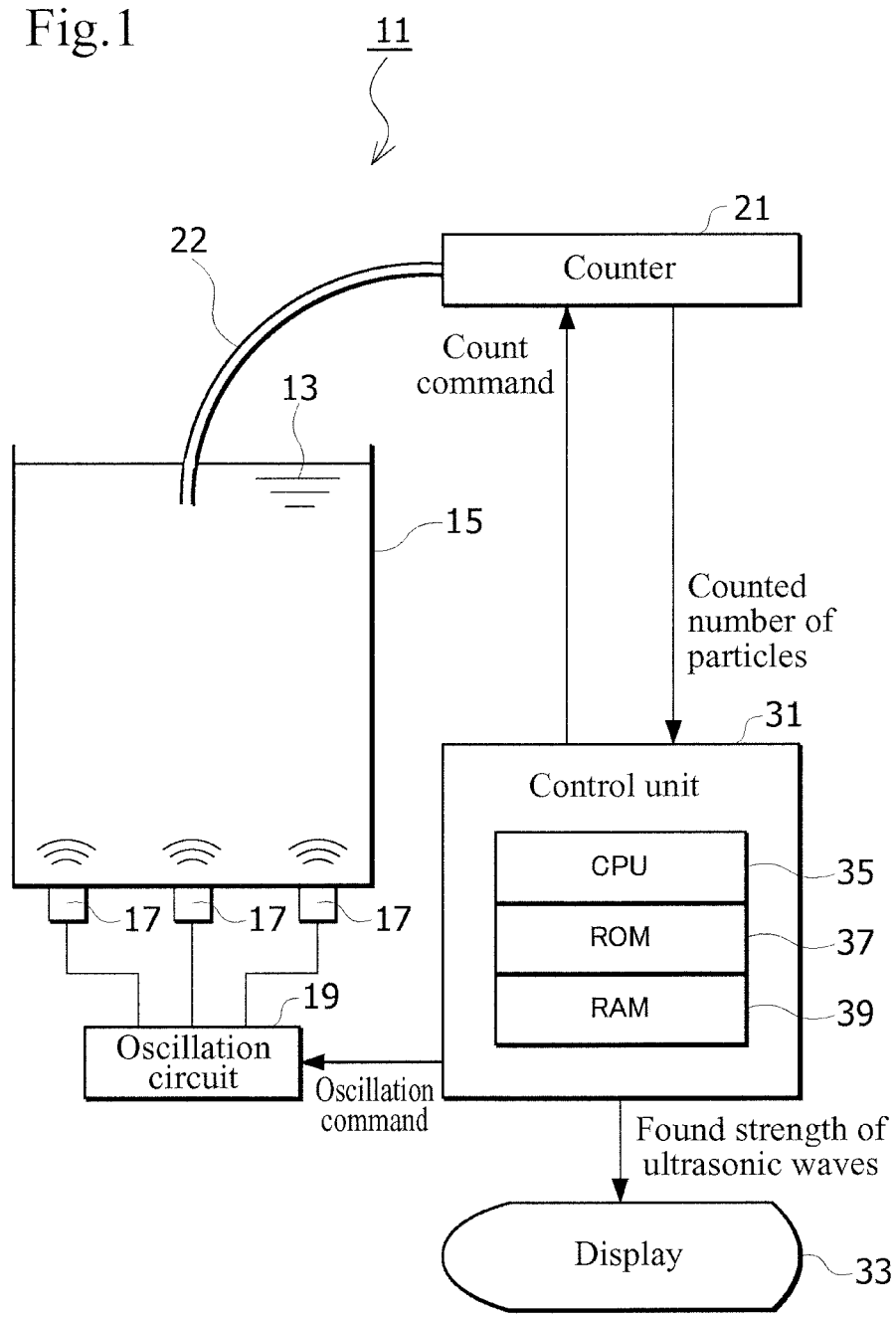
FIG. 1 is a block diagram illustrating an apparatus for measuring the strength of ultrasonic waves according to a first embodiment of the present invention.

In FIG. 1, the ultrasonic wave strength measuring apparatus 11 has a cleaning tank 15 containing a cleaning liquid 13, an oscillator 17 to generate and apply ultrasonic waves to an object to be washed soaked in the cleaning liquid 13, an oscillation circuit 19 connected to the oscillator 17, a counter 21 to count the number of particles eluted in the cleaning liquid 13, a control unit 31, and a display 33.

The cleaning liquid 13 is, for example, pure water, or pure water containing a proper cleaning agent. The cleaning liquid 13 is accommodated in the cleaning tank 15.

The oscillator 17 converts electric energy supplied from the oscillation circuit 19 into mechanical vibration energy. A plurality of oscillators 17 are arranged on a wall of the cleaning tank 15 such as a side wall or bottom wall. In the first embodiment, the oscillators 17 are arranged on the bottom wall.

The oscillation circuit 19 supplies a drive signal of predetermined frequency and strength to the oscillator 17.

The counter 21 counts the number of particles in the cleaning liquid 13. The counter 21 is provided with a tube 22 that serves as a particle source may be made of synthetic resin such as polyethylene and polypropylene. Instead of the synthetic resin, metal such as stainless steel may be employed to make the tube 22.

The counter 21 counts the number of particles contained in the cleaning liquid 13 taken through the tube 22. The particles whose number is counted by the counter 21 are those separated from the tube 22 vibrating with the ultrasonic waves and eluted into the cleaning liquid 13. It is preferable, therefore, that the particle source (22) and an intake tip of the tube 22 are close to each other. This is the reason why the tube 22 itself serves as the particle source. The present invention allows that the tube 22 and particle source are different parts.

According to the embodiment, the control unit 31 is a computer having a CPU 35, a ROM 37, a RAM 39, and other components.

The CPU 35 generally controls the ultrasonic wave strength measuring apparatus 11.

The ROM 37 stores programs used to measure the strength of ultrasonic waves, a correlation table 43, and other programs and data including a correlation table to be explained later.

The RAM 39 serves as a main memory of the computer and temporarily stores various kinds of data.

The display 33 has a display panel (not illustrated) to display found values of an ultrasonic wave strength found by the control unit 31.

Figure 2:
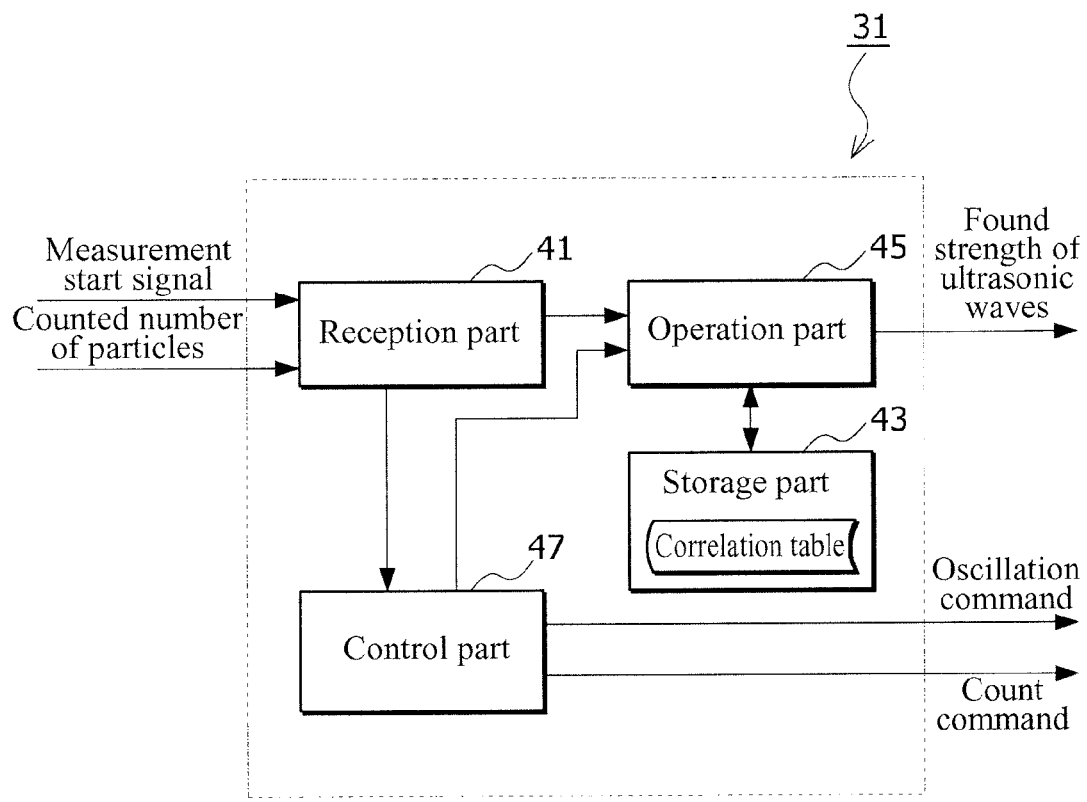
FIG. 2. is a functional block diagram illustrating a control unit of the apparatus of FIG. 1.

An internal structure of the control unit 31 will be explained with reference to FIGS. 2, 3A, 3B, and 3C in which FIG. 2 is a functional block diagram illustrating the control unit 31, FIG. 3A is a graph illustrating particle density curves on a time axis with respect to three ultrasonic wave strengths, FIG. 3B is a correlation table that correlates a particle number percentage with an ultrasonic wave strength percentage, and FIG. 3C is a graph based on the table of FIG. 3B.

In FIG. 2, the control unit 31 has a reception part 41, a storage part 43, an operation part 45, and a control part 47.

The reception part 41 receives a start signal that is given by an operator or at predetermined timing, to start measuring the strength of ultrasonic waves. The reception part 4i also receives the counted number of particles from the counter 21. The received data are transferred to the operation part 45 and control part 47.

The storage part 43 stores a correlation table that correlates the number of particles separated from the tube 22 with an ultrasonic wave strength. An example of the correlation table is the one illustrated in FIG. 3B. This correlation table correlates a particle number percentage with an ultrasonic wave strength percentage.

Making the correlation table will be explained. The cleaning liquid 13 is prepared and is put under predetermined conditions. For example, pure water is prepared as the cleaning liquid 13 and is maintained at 20 degrees centigrade.

At a predetermined position in the cleaning liquid 13, the tube (particle source) 22 is set. An ultrasonic wave strength percentage is changed among 100%, 75%, and 50%, and at each ultrasonic wave strength percentage, a particle density (the number of particles per milliliter) is measured at predetermined intervals. The measured data are plotted to draw curves as illustrated in FIG. 3A. It is understood from FIG. 3A that the separated and measured numbers of particles become stable about six minutes, preferably about ten minutes after the start of measurement. Namely, it is understood that the number of particles eluted from the tube (particle source) 22 into the cleaning liquid 13 stabilizes about six to ten minutes after the start of vibration of the tube 22 with the ultrasonic waves, to provide linear particle density data for each ultrasonic wave strength percentage.

These data are used to form the correlation table of FIG. 3B and the graph of FIG. 3C. These table and graph correlate a particle number percentage with an ultrasonic wave strength percentage. It is understood from the table and graph that a linear correlation is present between the particle number percentages and the ultrasonic wave strength percentages.

This means that the correlation table and the number of particles counted by the counter 21 are useful to find the strength of ultrasonic waves to vibrate the tube (particle source) 22. The tube 22 is immersed in the cleaning liquid 13 and vibrates with the ultrasonic waves for a predetermined time, and the counter 21 counts the number of particles in the cleaning liquid 13 picked up through the tube 22. Then, based on the counted number of particles and the correlation table of FIG. 3B or the graph of FIG. 3C, the strength of the ultrasonic waves is found. This is the principle of the present invention in finding the strength of ultrasonic waves according to the number of particles counted in the cleaning liquid 13. According to the present invention, it may be configured to consider the number of particles counted in the cleaning liquid 13 as the strength of the ultrasonic waves applied to the tube 22. In this case, the number of particles should directly be related to the strength of ultrasonic waves applied to the tube 22 such that the number of particles indicates the strength of ultrasonic waves.

The operation part 45 finds an ultrasonic wave strength according to the number of particles counted by the counter 21 and the correlation table stored in the storage part 43.

The control part 47 issues an oscillation command to make the oscillation circuit 19 achieve an oscillation operation and a count command to make the counter 21 count the number of particles.

A method of measuring the strength of ultrasonic waves according to the first embodiment of the present invention will be explained with reference to FIG. 4 which is a flowchart thereof. The method is carried out with the use of the ultrasonic wave strength measuring apparatus 11 of FIG. 1. The cleaning water 13 is prepared from clean pure water and is maintained at 20 degrees centigrade.

Figure 4:
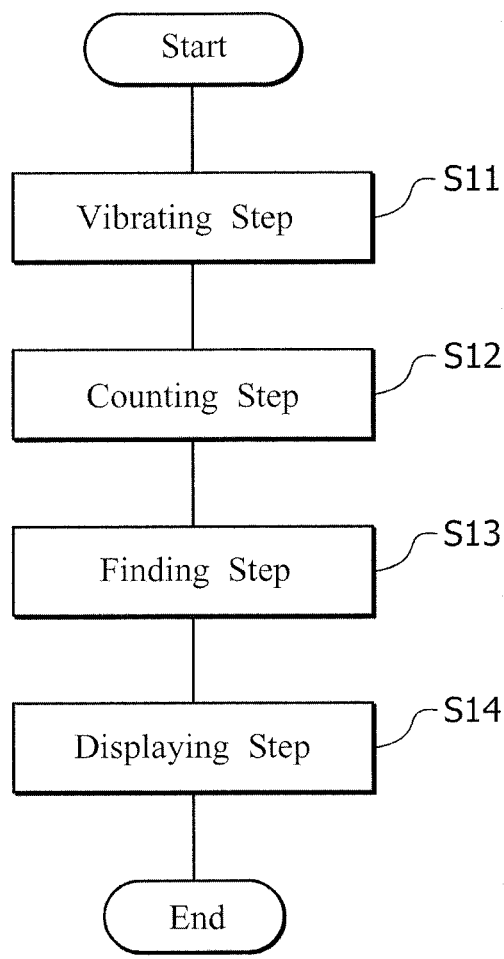
FIG. 4 is a flowchart illustrating a method of measuring the strength of ultrasonic waves according to the first embodiment of the present invention.

In FIG. 4, step S11 is a vibrating step that generates ultrasonic waves whose strength is going to be measured and applies the generated ultrasonic waves to the tube (particle source) 22 immersed in the cleaning water 13. Due to this, the tube 22 vibrates with the ultrasonic waves and particles are eluted from the tube 22 into the cleaning water 13. The elution step S11 is carried out for a predetermined time, for example, 10 minutes within which the number of eluted particles becomes stable as explained with reference to FIG. 3A.

Step S12 is a counting step that counts the number of particles in the cleaning liquid 13. After carrying out the elution step S11 for the predetermined time, the number of particles separated from the tube 22 and eluted in the cleaning liquid 13 stabilizes. Then, the counting step S12 takes the cleaning liquid 13 through the tube 22 and counts the number of particles in the taken cleaning water 13 with the counter 21.

Step S13 is a finding step that finds the strength of the ultrasonic waves applied to the tube 22 according to the counted number of particles. The finding step S13 is carried out by the operation part 45 in the control unit 31 with reference to the correlation table stored in the storage part 43 and correlates the counted number of particles with a ultrasonic wave strength.

Step S14 is a displaying step that displays the ultrasonic wave strength found in the finding step S13 on the display 33, so that the operator or the user can visually grasp the strength of the ultrasonic waves applied to the tube (particle source) 22.

Figure 5:
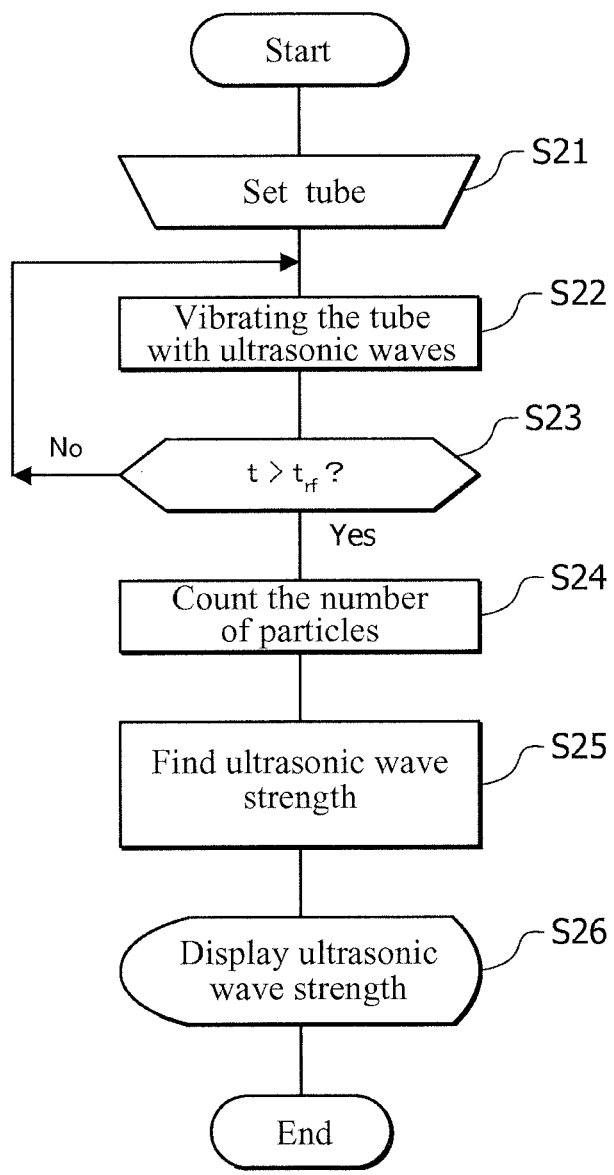
FIG. 5 is a flowchart illustrating operation of the control unit of FIG. 2.

Operation of the control unit 31 of the ultrasonic wave strength measuring apparatus 11 will be explained with reference to FIG. 5 which is a flowchart illustrating the operation.

Step S21 sets the tube (particle source) 22 at a predetermined position of the cleaning tank 15. The predetermined position is not particularly limited. In this embodiment, the tube 22 is inserted into the cleaning liquid 13 at around the center of the cleaning tank 15 and is fixed in this state, for example. The intake tip of the tube 22 in the cleaning liquid 13 is at a depth of, for example, about 10 cm. The size of the cleaning tank 15 is not particularly limited. In this embodiment, the cleaning tank 15 has dimensions of 500 mm×500 mm×400 mm×100 liters, for example.

Step S22 starts to generate ultrasonic waves whose strength is going to be measured to vibrate the tube 22 in the cleaning liquid 13. The ultrasonic waves are generated at a rated oscillation output in the range of for example, 500 W to 1000 W and at a frequency in the range of, for example, 40 kHz to 1 MHz.

Step S23 checks to see if a predetermined time "trf" has passed from the start of oscillation. The time trf is set to be a time within which the number of particles separated from the tube (particle source) 22 stabilizes. The predetermined time used as trf is, for example, 10 minutes as explained with reference to FIG. 3A.

If step S23 determines that the time trf has not yet passed, step S22 is repeated. If step S23 determines that the time trf has passed, step S24 is carried out.

Step S24 counts the number of particles with the counter 21. Namely, step S24 takes the cleaning liquid 13 through the tube 22 and makes the counter 21 count the number of particles in the taken cleaning liquid.

Step S25 makes the operation part 45 find an ultrasonic wave strength according to the number of particles counted by the counter 21 and the correlation table stored in the storage part 43.

Step S26 displays the ultrasonic wave strength found in step S25 on the display 33, so that the user or the operator may visually grasp the strength of the ultrasonic waves applied to the tube (particle source) 22.

In this way, the method of measuring the strength of ultrasonic waves according to the first embodiment of the present invention carries out the steps of vibrating the particle source 22 soaked in the cleaning liquid 13 with ultrasonic waves whose strength is going to be measured, so that particles are eluted from the particle source 22 into the cleaning liquid 13, counting the number of particles in the cleaning liquid 13, and finding the strength of the ultrasonic waves based on the counted number of particles. The method is capable of finding the strength of ultrasonic waves easily and at low cost without using a sound pressure meter.

The method employs the correlation table that correlates the number of particles separated from the particle source 22 with an ultrasonic wave strength. Based on the correlation table and the number of particles counted by the counter 21, the finding step (S13, S25) finds the strength of ultrasonic waves applied to the particle source 22. This configuration accurately finds an ultrasonic wave strength easily and at low cost.

The correlation table may correlate a particle number percentage with an ultrasonic wave strength percentage. In this case, the correlation table is simplified.

The particle source 22 may be the tube 22 to take the cleaning liquid 13 from the cleaning tank 15. The counting step (S12, S24) counts the number of particles in the cleaning liquid 13 taken through the tube 22. The tube 22 serving as the particle source is a part of the counter 21 with which the ultrasonic wave strength measuring apparatus 11 is generally provided. With this configuration, the particle source and the intake tip of the tube 22 are close to each other, so that the number of particles separated from the particle source is accurately countable. In addition, this configuration eliminates the need of preparing a discrete particle source.

The vibrating step (S11, S22, S23) continues to vibrate the particle source 22 soaked in the cleaning liquid 13 with the ultrasonic waves until the predetermined time "trf" elapses. After the predetermined time trf, the number of particles separated from the particle source 22 stabilizes. Then, the counting step (S12, S24) counts the number of particles in the cleaning liquid 13. This configuration is capable of correctly counting the number of particles separated from the particle source 22 and finding an accurate ultrasonic wave strength easily and at low cost.

The ultrasonic wave strength measuring apparatus 11 according to the first embodiment of the present invention has the tube (particle source) 22 soaked in the cleaning liquid 13, the oscillator 17 to generate ultrasonic waves whose strength is going to be measured to vibrate the particle source 22 so that particles are eluted from the particle source 22 into the cleaning liquid 13, the counter 21 to count the number of particles in the cleaning liquid 13, and the operation unit 31 to find the strength of the ultrasonic waves based on the counted number of particles. The apparatus is capable of measuring the strength of ultrasonic waves easily and at low cost without using a sound pressure meter.

The ultrasonic wave strength measuring apparatus 11 has the storage part 43 that stores the correlation table to correlate the number of particles separated from the particle source 22 with an ultrasonic wave strength. Based on the number of particles counted by the counter 21 and the correlation table, the operation part 45 finds the strength of ultrasonic waves applied to the particle source 22. This configuration accurately finds an ultrasonic wave strength easily and at low cost.

The correlation table stored in the storage part 43 may correlate a particle number percentage with an ultrasonic wave strength percentage. In this case, the correlation table is simplified.

The particle source 22 may be made of synthetic resin. This configuration provides the particle source 22 with a uniform characteristic to separate particles therefrom with respect to an ultrasonic wave strength. In addition, the particle source 22 made of synthetic resin is mass-producible at low cost.

The particle source 22 may be the tube 22 to take the cleaning water 13 from the cleaning tank 15. The counter 21 counts the number of particles in the cleaning water 13 taken through the tube 22. The tube 22 serving as the particle source is a part of the counter 21 with which the ultrasonic wave strength measuring apparatus 11 is generally provided. With this configuration, the particle source and the intake tip of the tube 22 are close to each other, so that the number of particles separated from the particle source is correctly counted by the counter 21. This configuration eliminates the need of separately preparing a particle source.

The cleaning liquid 13 may be pure water. This configuration is capable of correctly counting the number of particles separated from the particle source without the influence of impurities. This results in finding an ultrasonic wave strength easily and at low cost.

The ultrasonic wave strength found according to the embodiment is used to estimate a cleaning effect on an object to be cleaned. To estimate a cleaning effect, the conditions of the cleaning liquid 13 including the behavior, the temperature and the like thereof must carefully be considered. The conditions, however, change every moment. Accordingly, to correctly grasp an actual cleaning effect on the object, it is necessary to examine the object after the cleaning in general.

To carry out an easy estimation of the cleaning effect without examining the object after the cleaning, cleaning conditions must be maintained.

In view of these factors, the present invention measures the strength of ultrasonic waves by counting the number of particles separated from the particle source 22 to which the ultrasonic waves are applied. Before achieving the present invention, it is possible to set various cleaning conditions so that the measured ultrasonic wave strength correctly represents the cleaning effect of the ultrasonic waves.

Thus, the ultrasonic wave strength obtained according to the present invention is adequate to correctly estimate the cleaning effect of the ultrasonic waves.

Although the present invention has been explained by reference to certain embodiments of the present invention, the present invention is not limited to these embodiments. Modifications and variations of the embodiments will occur to those skilled in the art in light of the teachings mentioned in the specification and claims. Methods of and apparatuses for measuring the strength of ultrasonic waves according to such modifications and variations also fall in the scope of the present invention.

For example, the particle source is not limited to the tube 22 belonging to the counter 21. According to the present invention, the particle source may be any material if the material separates particles therefrom in proportion to the strength of ultrasonic waves applied to the material.

Although each of the embodiments places a single particle source (tube 22) in the cleaning liquid 13, the present invention is not limited to this. The present invention allows a plurality of particle sources to be placed in the cleaning liquid 13. Such a plurality of particle sources may be arranged at random or regularly.

What is claimed is:

1. A method of measuring the strength of ultrasonic waves for use with an ultrasonic cleaner that applies ultrasonic waves to an object soaked in a cleaning liquid in a cleaning tank and thereby cleans the object, the method comprising steps of:
    vibrating a particle source soaked in the cleaning liquid with the ultrasonic waves whose strength is going to be measured when the object is not soaked in the cleaning fluid, so that particles are eluted from the particle source into the cleaning liquid;
    counting a number of particles in the cleaning liquid; and
    finding the strength of the ultrasonic waves based on the counted number of particles; and
    wherein the finding step finds the strength of the ultrasonic waves based on the counted number of the eluted particles according to a correlation between the number of the eluted particles and the strength of the ultrasonic waves, the correlation obtained in advance by vibrating with ultrasonic waves the particle source that is soaked into the cleaning liquid and correlating the number of eluted particles separated from the vibrated particle source with strength of the ultrasonic waves.

2. The method of claim 1, wherein the correlation table correlates a particle number percentage with an ultrasonic wave strength percentage.

3. The method of claim 1, wherein the particle source is a tube configured to take the cleaning liquid from the cleaning tank, and
    the counting step counts the number of particles contained in the cleaning liquid taken through the tube.

4. The method of claim 1, wherein the vibrating step continues to vibrate the particle source soaked in the cleaning liquid with the ultrasonic waves for a predetermined time, the predetermined time being so set that the number of particles separated from the particle source becomes stable, and
    the counting step counts the number of particles in the cleaning liquid after elapsing the predetermined time.

5. A method of measuring the strength of ultrasonic waves for use with an ultrasonic cleaner that applies ultrasonic waves to an object soaked in a cleaning liquid in a cleaning tank and thereby cleans the object, the method comprising steps of:
    soaking a particle source in the cleaning liquid and composed of particles to be eluted into the cleaning liquid by vibrating the particle source with ultrasonic waves so that a number of the eluted particles varies linearly according to the strength of the ultrasonic waves;
    vibrating the particle source soaked in the cleaning liquid with the ultrasonic waves whose strength is going to be measured, so that particles are eluted from the particle source into the cleaning liquid;
    counting the number of the eluted particles in the cleaning liquid; and
    finding the strength of the ultrasonic waves based on the counted number of the eluted particles.

6. A method of measuring the strength of ultrasonic waves propagating through a cleaning liquid in a cleaning tank used for cleaning an object, the method comprising steps of:
    propagating ultrasonic waves through the cleaning liquid using an oscillator;
    vibrating a particle source at least partially submerged in the cleaning liquid within the cleaning tank with said ultrasonic waves while said object is not within said cleaning tank, whereby particles are eluted from the particle source into the cleaning liquid;
    counting a number of particles in the cleaning liquid; and
    finding a strength of the ultrasonic waves based on the counted number of particles; and
    wherein the particle source is distinct from said object to be cleaned;
    wherein the finding step finds the strength of the ultrasonic waves based on the counted number of the eluted particles according to a previously-determined correlation between the number of the eluted particles and the strength of the ultrasonic waves, and
    wherein the previously determined correlation is obtained in advance by counting the number of eluted particles at different oscillator settings while the particle source is at least partially submerged in the cleaning liquid within the cleaning tank and the object is absent from said tank and thereby derive different percentage ratings of strength of the ultrasonic waves.

* * * * *